Oct. 4, 1932.   B. A. WITTKUHNS   1,881,011
SYNCHRONOUS TRANSMISSION AND TORQUE AMPLIFYING SYSTEM
Filed Feb. 24, 1930
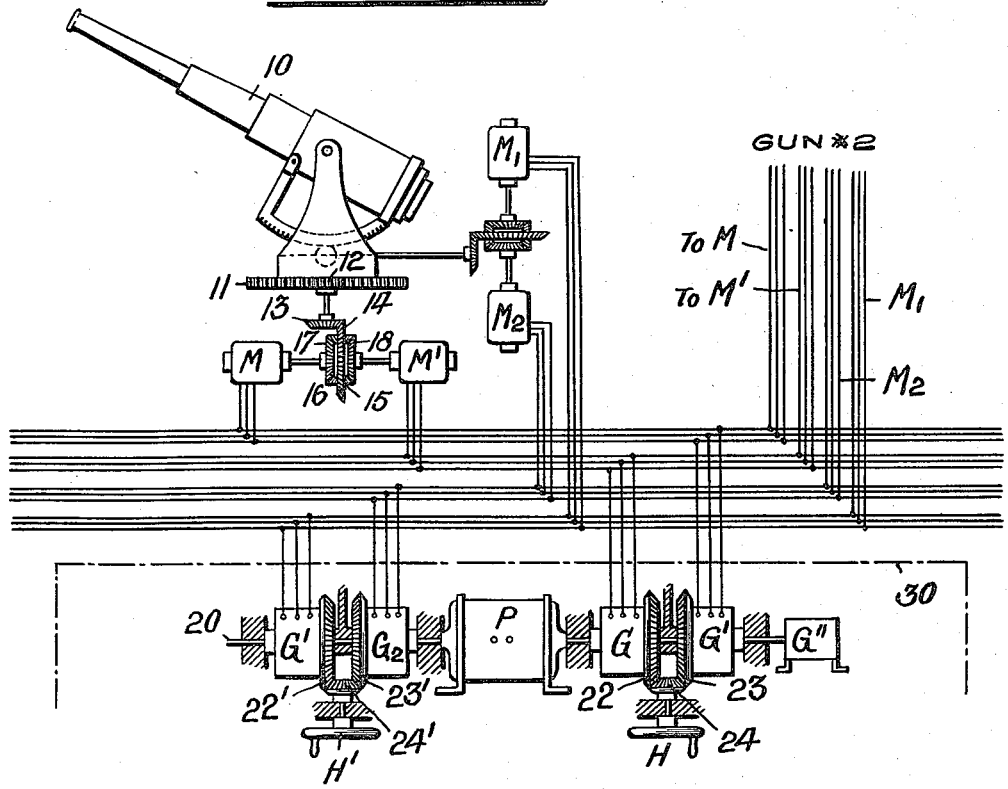
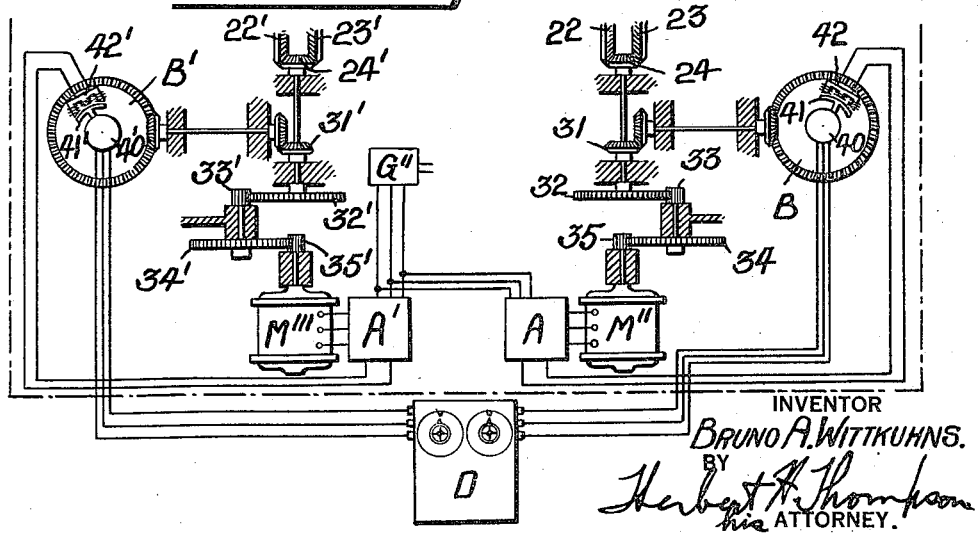
INVENTOR
BRUNO A. WITTKUHNS.
BY
Herbert H. Thompson
his ATTORNEY.

Patented Oct. 4, 1932

1,881,011

UNITED STATES PATENT OFFICE

BRUNO A. WITTKUHNS, OF CHATHAM, NEW JERSEY, ASSIGNOR TO SPERRY GYROSCOPE COMPANY, INC., OF BROOKLYN, NEW YORK, A CORPORATION OF NEW YORK

SYNCHRONOUS TRANSMISSION AND TORQUE-AMPLIFYING SYSTEM

Application filed February 24, 1930. Serial No. 430,687.

This invention relates to synchronous transmission systems having as their principal object the transmission of movement to one or more receivers and the quick and accurate response of said receivers to the transmitted impulses.

It is a further object of this invention to provide a synchronous transmission system, the principle of which may be utilized in the operation of electric torque-amplifying devices for moving objects, particularly heavy objects.

The invention further relates to a remote control of such torque-amplifying devices which will give accurate positioning and ready response of the distant object to the impulses transmitted from a control station.

For the above purposes this invention includes a synchronous A. C. transmission system comprising balanced A. C. generators of identical design which operate motors in synchronism therewith. The relative frequencies of the generators are controlled to control the differential speeds of the motors and suitable means is provided to be operated in response to differences in speeds of said motors. Among the advantages of such a system are, first, that synchronism of movement between the transmitter generators and the receiver motors is effected with a maximum lag of less than one pole width of the motor; second, any number of sets of receiving motors may be operated in parallel from the same set of transmitter generators up to the capacity of the generators; third, due to the automatic balancing of the generators the control requires only enough torque to overcome the friction of the controlling parts, which friction may be reduced by well known means, such as anti-friction bearings. Hence, it is possible to control the movements of a heavy object, such as a large gun or searchlight, by the application of very little force or through the operation of a transmitter on a distant directorscope.

Further objects and advantages of this invention will become apparent in the following detailed description thereof:

In the accompanying drawing,

Fig. 1 is an assembly view, largely diagrammatic, disclosing the principle of the synchronous transmission and one form of a torque amplifier.

Fig. 2 is an assembly view, also largely diagrammatic, showing a remote control unit for controlling the mechanism of Fig. 1.

Referring to Fig. 1 of the drawing, I have shown my invention as applied to the movement of a gun 10 in both azimuth and elevation, but it will become apparent from the following description that any other object may be moved by exactly the same means and that movement may be effected about any desired axis or axes other than, or in addition to, those disclosed. For moving the object 10 in azimuth, there is shown the usual annular rack 11 with which meshes a suitable pinion 12 adapted to be driven through gearing, such as 13—14, from the planetary member 15 of a differential, indicated generally by the numeral 16. It will be obvious that movement of pinion 12 and hence of the object will be effected only when there is movement of the planetary member 15 of the differential and that such movement will take place only when the opposite sides 17 and 18 of the differential, which rotate in opposite directions, are rotated at different speeds. The gears 17 and 18 forming two sides of the differential are driven from two three-phase A. C. synchronous motors M—M' which are rotated continuously from three-phase A. C. generators G—G'. Said generators have their armatures fixed upon the same shaft 20 forming the extension of the driven shaft of the motor or prime mover P. The stators of the generators G—G' are also rotatably mounted. As along as the stators do not rotate, the frequencies of the two generators are the same and, therefore, the speeds of motors M and M' are equal and opposite and there is no movement of the planetary member 15 of the differential, and hence no movement of the object in azimuth.

When it is desired to move the object, a difference in frequencies is impressed upon the motors M—M' in the following manner. As heretofore stated the stators of the generators G—G' are rotatably mounted and since the armatures of said generators rotate at the same speed a difference in frequencies is imparted by a differential movement of the stators of the two generators with respect to their armatures. For this purpose the stators of generators G—G' are provided with gears 22—23 which mesh with a bevel gear 24 so that rotation of the last-named gear will rotate gears 22—23 and hence the stators of the generators G—G' in opposite directions so that the relative speeds of the armatures of the generators with respect to the fields are changed and hence the frequencies of motors M—M' are changed. The direction of rotation of gear 24 determines which of the generators G—G' has its frequency increased and which generator has its frequency decreased, and hence determines the respective speeds of the motors M—M' and thereby the direction of rotation of annular member 15 of the differential and the direction of movement of the object.

While the stators of the generators remain stationary the drag upon the stators by their armatures is the same in each case, and these stators, through their gears 22 and 23, react upon gear 24 in opposite directions so as mechanically to balance each other and thus avoid placing great torque upon the gear 24, so that only sufficient force need be applied to gear 24 to overcome the frictional resistance to movement of the stators when it is desired to change the frequencies of the generators. This torque can be further reduced to a very slight quantity by mounting the stators in well known anti-friction bearings. Even during the period that the frequencies of the generators are being changed by opposite rotation of the stators, the decreased drag of the armature on the stator moving in the same direction as its armature is counter-balanced by the increased resistance offered by the stator which is moving in a direction opposite to that of its armature, so that mechanical balance between the generators with respect to the operating gear is maintained at all times. The force necessary to change the frequencies, therefore, depends only upon the friction to be overcome and upon the inertia and speed of the parts moved mechanically by gear 24, and not upon the size or number of objects to be moved by the receiver-motors.

For rotating the gear 24 to change the frequencies of the generators and hence to move the object in one direction or the other, I may provide an ordinary handwheel H fixed upon the shaft of gear 24. Any angular movement of the handwheel H results in a proportional angular movement of the transmitter generator stators in opposite directions. Therefore, simultaneously with these movements, the frequencies of the generators are increased and decreased, respectively, resulting in immediate responses of the receiver motors M—M', which, figuratively speaking, are locked tightly to their frequencies. As their speeds are directly proportional to their frequencies, the differences of their momentary speeds against their normal speeds is at every instant equal to the difference of the actual speeds in R. P. M. of the stators of their generators. It is, therefore, obvious that as soon as the stators of the generators are rotated, their actual rotating speeds will be added and subtracted, respectively, from the speeds of the motors, with the result, that the gear 13 will rotate in a certain proportion to the speed of the handwheel H. This proportion is given by the gear ratios and the respective numbers of poles of generators and motors. Assuming that the over-all gear ratio is 1:1 and that motors and generators have equal numbers of poles, then a 10 degree angular motion of the handwheel H will result in a 10 degree angular motion of gear 13, this motion being transmitted without any time lag. My invention, therefore, represents primarily a synchronous transmission system. Inasmuch as the initial torque at the handwheel H is very small compared to the capacity of the generators and motors, which may be rated at hundreds of horsepower, and inasmuch as the full torque of the motors M—M' is available to act on gear 13, my invention may well be classified as a torque amplifier. The amplification factor depends only upon the size and capacity of the generators and motors.

It will be apparent that I have effected a system whereby the relative speeds of the generator rotors with respect to their stators is varied to vary the frequencies of the generators and, hence, the speeds of the motors. The same result can be accomplished by varying the relative speeds of the generator rotors while maintaining the stators stationary, or by a combination of these two, i. e., by changing the speeds of the generator rotors relative to each other and by moving the stators relative to each other. In any case, the same result is obtained, i. e., a variation of the relative speeds of the generator rotors with respect to their stators.

If the object to be moved has to be controlled not by hand, as in the case discussed above, but by remote control means, it is possible to arrange a cascade of two or more such torque-amplifiers, or to use other well known means for revolving gear 24. In Fig. 2 I show how another kind of torque-amplifier, commonly referred to as a follow-up system, may be used to actuate gear 24.

In this system there is disclosed how the generator stators can be operated from a remote directorscope. The gear 24 in this instance is operated through suitable gearing designated by the numerals 31 to 35 inclusive operated from a motor M'' which may be controlled from an amplifier A which is adapted to amplify the slight voltages which are transmitted thereto from a motion-detector B whose function it is to detect slight movements of the movable member of the directorscope D. The movements of the directorscope D are designed to operate an A. C. transmission system to rotate a member 40 which carries an armature 41 movable with respect to a transformer 42. Said transformer comprises three poles, the outer poles having equally wound coils and the middle pole carrying a coil through which flows a constant exciting A. C. current. When the armature 41 is symmetrically positioned with respect to the three poles, the voltage induced in one outer transformer coil and the middle coil is the same as, but opposed to, that induced in the other outer coil and the middle coil, and hence no voltage is transmitted to the amplifier A. But when the directorscope element moves, the member 40 is correspondingly moved and moves the armature 41 with respect to the transformer. Thus the gap at one side of the transformer increases and the gap at the other side decreases so that the induced opposed voltages in the outer coils are no longer equal. The difference is transmitted to the amplifier A. The output of the amplifier operates motor M'' in one direction or the other depending upon the direction of movement of armature 41 to move the stators of the generators G—G' in one direction or the other and hence correspondingly move the object. The transformer system for controlling the operation of a torque-applying member, such as motor M'', is fully described in my copending application with Frederic M. Watkins, Serial No. 381,660 for non-contacting follow-up systems, filed July 27, 1929, and my application Serial No. 433,562 for amplifier, filed March 6, 1930, and need not be further described here, especially since the action is quite clear. A generator G'' may be supplied and driven from the shaft of the prime mover or motor P for supplying A. C. current to the amplifier A.

It will be obvious that the generator mechanism may be located at a remote point from the object and the motors to which it is connected through the cables, and these generators may be built as a unit designated in the drawing as within the dot and dash lines 30 and enclosed in a bomb-proof remote position.

It is apparent that any number of sets of motors, such as M—M', may be operated from the same set of generators G—G', so that any number of objects may be simultaneously moved thereby. This is clearly shown in Fig. 1 wherein the necessary conductors connected in parallel with motors M—M' are leading to another set of motors M—M' for operating what is here designated as gun or object No. 2.

Referring to Fig. 1 of the drawing again, it will be seen that a second set of generators $G—G_2$ may be operated from the same prime mover or motor P for actuating a second set of motors $M_1—M_2$ which will control the movements of the object about a different axis. The action, however, is exactly the same, and in the same manner other sets of motors $M_1$ and $M_2$ may be connected in parallel with these lines to be operated from the same set of generators. Similar parts are designated by the same numerals primed.

Similarly it will be apparent that the remote control system for remotely controlling the operation of the generator stators may be duplicated in the case of the generators which control the motors $M_1$ and $M_2$ by a mere duplication of the parts as disclosed in Fig. 2. The duplicated parts bear the same numerals primed.

A further advantage of my invention is found in the fact that all torque exerting members, as for instant, motors M—M' are continuously running so that there is no static friction and no inertia to be overcome in the motors. The object consequently will start in motion much quicker than if the motor would have to be started from a stationary condition.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a synchronous electric transmission and torque-amplifying system, said system comprising a plurality of substantially equal A. C. generators and a plurality of synchronous motors operated by said generators, said generators having rotors and rotatable stators, means for operating said rotors at equal speeds, means for turning said stators relative to each other for varying the frequencies of said generators and the speeds of said motors, and means operated in response to the differential speeds of said motors.

2. In a synchronous electric transmission and torque-amplifying system, said system comprising a plurality of similar A. C. generators and a plurality of synchronous motors operated by said generators, said generators having rotors and rotatable stators, means for operating said rotors at equal speeds, means for moving said stators simultaneously in opposite directions relative to each other for varying the frequencies of said generators and the speeds of said motors, and means operated in response to the differential speeds of said motors.

3. In a synchronous electric transmission and torque-amplifying system, said system comprising a plurality of similar A. C. generators and a plurality of synchronous motors operated by said generators, said generators having rotors and rotatable stators, means for operating said rotors at equal speeds, means for moving said stators simultaneously in opposite directions relative to each other for varying the frequencies of said generators and the speeds of said motors, means for mechanically balancing the reactions of said rotors on said stators against each other, and means operated in response to the differential speeds of said motors.

4. In a synchronous electric transmission and torque-amplifying system, said system comprising a plurality of similar A. C. generators and a plurality of synchronous motors operated by said generators, said generators having rotors and rotatable stators, means for operating said armatures at equal speeds, means for moving said stators simultaneously in opposite directions relative to each other for varying the frequencies of said generators and the speeds of said motors, said last-named means including a common actuating gear and a gear fixed to each stator and engaging opposite sides of said actuating gear to balance mechanically the reaction of said rotors on said stators, and means operated in response to the differential speeds of said motors.

5. In a synchronous electric transmission and torque-amplifying system, said system comprising a plurality of similar A. C. generators and a plurality of synchronous motors operated by said generators, said generators having rotors and rotatable stators, means for continuously driving one of said parts at a constant speed, means for differentially turning the other of said parts of the generators for temporarily altering the relative frequencies of said generators and the speeds of said motors, and means positioned in response to the differential speeds of said motors.

6. In a remote control system for positioning an object, the combination with a sending device and the controlled object to be positioned therefrom, of a pair of synchronously driven similar A. C. generators, a pair of synchronous motors driven from said generators, differential means connecting said motors and said object so that said object stands still while the speeds of said motors are equal, said generators being provided with adjustable stators oppositely positioned from said sending device whereby the relative frequencies of said generators may be temporarily altered to temporarily change the relative speed of said motors whereby said object may be positioned in accordance with the position of the sending device.

7. In a remote control system for positioning an object, the combination with a sending device and the controlled object to be positioned therefrom, of a pair of synchronously driven similar A. C. generators, a pair of synchronous motors driven from said generators, differential means connecting said motors and said object so that said object stands still while the speeds of said motors are equal, at least one of said generators being provided with an adjustable stator positioned from said sending device whereby the relative frequencies of said generators may be temporarily altered to temporarily change the relative speed of said motors whereby said object may be positioned in accordance with the position of the sending device.

8. In a remote control system for positioning an object, the combination with a sending device and the controlled object to be positioned therefrom, of a pair of synchronously driven similar A. C. generators, a differential electrical device having one winding in circuit with one generator and another winding in circuit with the other generator, said device being connected to said object so that said object normally stands still, said generators being provided with adjustable stators oppositely positioned from said sending device whereby the relative frequencies of said generators may be temporarily altered whereby said object may be positioned in accordance with the position of the sending device.

9. In a remote control system for positioning an object, the combination with a sending device and the controlled object to be positioned therefrom, of a pair of synchronously driven similar A. C. generators, a differential electrical device having one winding in circuit with one generator and another winding in circuit with the other generator, said device being connected to said object so that said object normally stands still, at least one of said generators being provided with an adjustable stator positioned from said sending device whereby the relative frequencies of said generators may be temporarily altered whereby said object may be positioned in accordance with the position of the sending device.

In testimony whereof I have affixed my signature.

BRUNO A. WITTKUHNS.